United States Patent
Lee

(10) Patent No.: US 9,794,909 B2
(45) Date of Patent: Oct. 17, 2017

(54) METHOD AND APPARATUS FOR PAGING TERMINATED CALL IN MOBILE COMMUNICATION SYSTEM

(71) Applicant: Samsung Electronics Co. Ltd., Suwon-si, Gyeonggi-do (KR)

(72) Inventor: Kang-Gyu Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 13/921,874

(22) Filed: Jun. 19, 2013

(65) Prior Publication Data
US 2014/0256319 A1  Sep. 11, 2014

(30) Foreign Application Priority Data
Mar. 11, 2013  (KR) .................... 10-2013-0025546

(51) Int. Cl.
*H04W 68/00* (2009.01)
*H04W 60/04* (2009.01)

(52) U.S. Cl.
CPC .......... *H04W 68/005* (2013.01); *H04W 60/04* (2013.01)

(58) Field of Classification Search
CPC .................................................. H04W 68/005
See application file for complete search history.

(56) References Cited

U.S. PATENT DOCUMENTS

| | | | | |
|---|---|---|---|---|
| 8,743,828 B2 * | 6/2014 | Wang et al. | ................... | 370/331 |
| 2001/0034233 A1 * | 10/2001 | Tiedemann et al. | .......... | 455/436 |
| 2004/0100940 A1 * | 5/2004 | Kuure et al. | ................... | 370/349 |
| 2007/0123195 A1 * | 5/2007 | Lv et al. | ........................ | 455/403 |
| 2009/0047951 A1 | 2/2009 | Yeoum et al. | | |
| 2009/0149185 A1 * | 6/2009 | Narasimha | ..................... | 455/442 |

(Continued)

FOREIGN PATENT DOCUMENTS

| | | |
|---|---|---|
| EP | 1 937 013 A1 | 6/2008 |
| EP | 2 034 791 A1 | 3/2009 |

(Continued)

OTHER PUBLICATIONS

XP050707928 "3rd Generation Partnership Project; Technical Specification Group Services and System Aspects; Circuit Switched (CS) fallback in Evolved Packet System(EPS); Stage 2(Release 11)", Feb. 12, 2013.

*Primary Examiner* — Magdi Elhag
*Assistant Examiner* — David Orange
(74) *Attorney, Agent, or Firm* — Jefferson IP Law, LLP

(57) ABSTRACT

A method and an apparatus for paging a terminated call in a new Mobility Management Entity (MME) of a mobile communication system are provided. The method includes receiving a Tracking Area Update (TAU) REQUEST message from a target terminal which will receive a voice call when the target terminal moves from a currently accessed cell to a cell included in another Tracking Area Identity (TAI) list and the target terminal accesses a packet network, sending an inquiry to an old MME which manages a TAI about whether a terminated call paging for the target terminal is being performed, generating a TAU ACCEPT message including a voice call paging indicator when an answer corresponds to performance of the terminated call paging for the target terminal, and transmitting the TAU ACCEPT message to the target terminal.

14 Claims, 6 Drawing Sheets

(56) References Cited

U.S. PATENT DOCUMENTS

| | | |
|---|---|---|
| 2009/0247165 A1* | 10/2009 | Chen et al. .................. 455/436 |
| 2009/0298471 A1 | 12/2009 | He |
| 2010/0303041 A1 | 12/2010 | Diachina et al. |
| 2010/0323695 A1 | 12/2010 | Kallio et al. |
| 2011/0075675 A1* | 3/2011 | Koodli et al. ............... 370/401 |
| 2011/0076987 A1* | 3/2011 | Lee et al. .................... 455/411 |
| 2011/0194505 A1* | 8/2011 | Faccin ................ H04W 48/18 370/329 |
| 2012/0189016 A1* | 7/2012 | Bakker et al. ............... 370/401 |
| 2012/0224476 A1* | 9/2012 | Jin et al. ..................... 370/229 |
| 2012/0282941 A1* | 11/2012 | Lu et al. .................... 455/452.1 |
| 2012/0309419 A1 | 12/2012 | Lee et al. |
| 2013/0083650 A1* | 4/2013 | Taleb et al. .................. 370/218 |
| 2013/0301466 A1* | 11/2013 | Nenner ............ H04W 36/0022 370/252 |
| 2014/0036873 A1* | 2/2014 | Cheng et al. ................ 370/331 |
| 2014/0206352 A1 | 7/2014 | Mochizuki et al. |

FOREIGN PATENT DOCUMENTS

| | | |
|---|---|---|
| EP | 2 908 582 A1 | 8/2015 |
| WO | 2012/124894 A1 | 9/2012 |
| WO | 2013/022067 A1 | 2/2013 |

\* cited by examiner

METHOD AND APPARATUS FOR PAGING TERMINATED CALL IN MOBILE COMMUNICATION SYSTEM

PRIORITY

This application claims the benefit under 35 U.S.C. §119(a) of a Korean patent application filed on Mar. 11, 2013 in the Korean Intellectual Property Office and assigned Serial No. 10-2013-0025546, the entire disclosure of which is hereby incorporated by reference.

BACKGROUND OF THE INVENTION

1. Field of the Invention

The present invention relates to a mobile communication system. More particularly, the present invention relates to a method and an apparatus for paging a terminated call in a mobile communication system.

2. Description of the Related Art

Mobile communication systems have been developed to provide communication while allowing for the mobility of users. Mobile communication systems have reached a stage where a high speed data communication service can be provided, as well as voice communication, because of the strength and rapid development of technologies.

Currently, a standardization shift from a 3rd Generation Partnership Project (3GPP) system to a Long Term Evolution (LTE) system is progressing in the direction of next generation mobile communication systems. The LTE system is a technology which implements high speed packet based communication having a transmission rate of a maximum of 100 Mbps faster than a data transmission rate of the conventional 3GPP system.

The LTE network is a packet based network, which is differentiated from Global System for Mobile communications (GSM)/General Packet Radio Service (GPRS) and Wideband Code Division Multiple Access (WCDMA) networks which provide all of packet/circuit services. Additionally, the LTE network simultaneously provides an Internet Protocol (IP) based service as the packet network and supports a circuit based service through interworking with a conventional generation mobile communication network. For example, technology supporting a voice call service in the LTE network includes Circuit Switched Fallback (CSFB), which disconnects LTE and uses a 3G (circuit network) when a terminal located in the LTE network receives a voice call, and Voice Over LTE (VoLTE) in which a terminal converts a user's voice to a data packet and transmits the converted data packet on the LTE network.

The LTE network divides its own service area into a plurality of areas according to a predetermined rule, allocates distinguishable identifiers to the divided areas, and registers and manages terminals which subscribe to the LTE network within each of the divided areas. Through the divided areas, the network initiates a terminated call service by broadcasting (referred to as "paging") information regarding whether a packet/circuit terminated call service for a particular subscriber terminal is generated to an area where the corresponding terminal is registered, or by informing the corresponding terminal of the fact in a one-to-one correspondence (referred to as "Circuit Switched (CS) notification").

The LTE network provides Tracking Area Identity (TAI) list information through which a paging message is broadcasted from the LTE network for the corresponding terminal through an ATTACH-ACCEPT message during an ATTACH procedure where the target terminal accesses the LTE network. The TAI list includes at least one area which is referred to as a Tracking Area (TA) and an identifier of an individual TA is referred to as a "Tracking Area Identity (TAI)".

When the terminal having successfully accessed the network moves from a currently accessed cell to a cell included in another TAI list, the terminal performs an area update through a Tracking Area Updating (TAU) procedure. The TAI list includes a plurality of TAIs. When the terminal moves within the corresponding TAI list, a separate TAU procedure is not performed. However, when a CS-domain terminated call for the target terminal operating in an idle mode is generated, the LTE network informs the corresponding target terminal of generation of the terminated call service by broadcasting the paging message to the area included in the previously informed TAI list.

When the generation of the CS-domain terminated call for the particular terminal is recognized, the LTE network broadcasts the paging message to the area included in the TAI list of the corresponding target terminal. When the corresponding target terminal moves to an area which is not included in the current TAI list, the paging message cannot be received.

Further, after the corresponding target terminal has completed the TAU procedure in an area which the target terminal newly enters and has received a new TAI list, most of the LTE networks do not re-transmit the paging message which had been transmitted to the old TAI list areas to the newly updated TAI list areas for the corresponding target terminal. Accordingly, a problem of stopping the terminated call service occurs.

Therefore, a need exists for a method and an apparatus for paging a terminated call in a mobile communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention provides a method and an apparatus for effectively receiving information regarding whether a terminated call is generated in a new area to which a terminal moves even though the terminal leaves an area where the terminal is most recently registered and moves to the new area in a mobile communication system.

Another aspect of the present invention is to provide a method and an apparatus for reducing the number of times that a mobile communication system broadcasts a paging message.

Another aspect of the present invention is to provide a method and an apparatus for continuously providing a terminated call service even though a terminal leaves an area where the terminal is most recently registered and moves to another area in a mobile communication system.

In accordance with an aspect of the present invention, a method of paging a terminated call in a new Mobility Management Entity (MME) of a mobile communication system is provided. The method includes receiving a Tracking Area Update (TAU) REQUEST message from a target terminal which will receive a voice call when the target terminal moves from a currently accessed cell to a cell included in another Tracking Area Identity (TAI) list and the target terminal accesses a packet network, sending an inquiry to an old MME which manages a TAI about whether a terminated call paging for the target terminal is being performed, generating a TAU ACCEPT message including a voice call paging indicator when an answer corresponds to performance of the terminated call paging for the target terminal, and transmitting the TAU ACCEPT message to the target terminal.

In accordance with another aspect of the present invention, an apparatus for paging a terminated call in a new MME of a mobile communication system is provided. The apparatus includes a receiver which receives a TAU REQUEST message from a target terminal which will receive a voice call when the target terminal moves from a currently accessed cell to a cell included in another TAI list and the target terminal accesses a packet network, a paging message detector which sends an inquiry to an old MME which manages a TAI about whether a terminated call paging for the target terminal is being performed, a TAU related message generator which generates a TAU ACCEPT message including a voice call paging indicator when an answer corresponds to performance of the terminated call paging for the target terminal, and a paging message transmitter which transmits the TAU ACCEPT message to the target terminal.

In accordance with another aspect of the present invention, a method of paging a terminated call in a terminal of a mobile communication system is provided. The method includes transmitting a TAU REQUEST message to a new MME when a target terminal moves from a currently accessed cell to a cell included in another TAI list and the target terminal accesses a packet network, receiving a TAU ACCEPT message including a voice call paging indicator from a new MME when a terminated call paging for the target terminal is being performed between an old MME and the new MME, and transmitting the TAU ACCEPT message to the target terminal.

In accordance with another aspect of the present invention, a method of paging a terminated call in a new MME of a mobile communication system is provided. The method includes receiving a TAU REQUEST message from a target terminal which will receive a voice call when the target terminal moves from a currently accessed cell to a cell included in another TAI list and the target terminal accesses a packet network, sending an inquiry to an old MME which manages a TAI about whether a terminated call paging for the target terminal is being performed, generating a TAU ACCEPT message when an answer corresponds to performance of the terminated call paging for the target terminal and transmitting the generated TAU ACCEPT message to the target terminal, and broadcasting a paging message to the cell.

In accordance with another aspect of the present invention, an apparatus for paging a terminated call in a new MME of a mobile communication system is provided. The apparatus includes a receiver which receives a TAU request message from a target terminal which will receive a voice call when the target terminal moves from a currently accessed cell to a cell included in another TAI list and the target terminal accesses a packet network, a paging message detector which sends an inquiry to an old MME which manages a TAI about whether a terminated call paging for the target terminal is being performed, a TAU related message generator which generates a TAU ACCEPT message when an answer corresponds to performance of the terminated call paging for the target terminal and transmits the generated TAU ACCEPT message to the target terminal, and a paging message transmitter which broadcasts a paging message to the cell.

According to exemplary embodiments of the present invention, a terminal can effectively receive information regarding whether a terminated call is generated in a new area to which the terminal moves even though the terminal leaves an area where the terminal is most recently registered and moves to the new area in a mobile communication system.

According to exemplary embodiments of the present invention, it is possible to save cost by reducing the number of times that a mobile communication system broadcasts a paging message.

According to exemplary embodiments of the present invention, a terminal can continuously provide a terminated call service even though the terminal leaves an area where the terminal is most recently registered and moves to another area in a mobile communication system.

Exemplary embodiments of the present invention provide a continuous and reliable terminated call service by transmitting information regarding whether MT CSFB is generated through a paging message or a TAU ACCEPT message including a CS paging indicator even though a target terminal is moving on a TAI list boundary in the Long Term Evolution (LTE) network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, the terms or words used in the specification and claims of the present invention are not interpreted using typical or dictionary limited meanings, and are constructed as meanings and concepts conforming to the technical spirit of the present invention based on the principle that the inventors can appropriately define the concepts of the terms to explain the present invention in the best manner.

Even though a terminal leaves an area where the terminal is most recently registered and moves to a new area, a Long Term Evolution (LTE) network re-transmits a paging message to the new area where the target terminal enters or informs of whether a terminated call is generated through a dedicated message. In this respect, the present invention can provide a method of continuously providing a CS-domain terminated call service.

Figure 1:
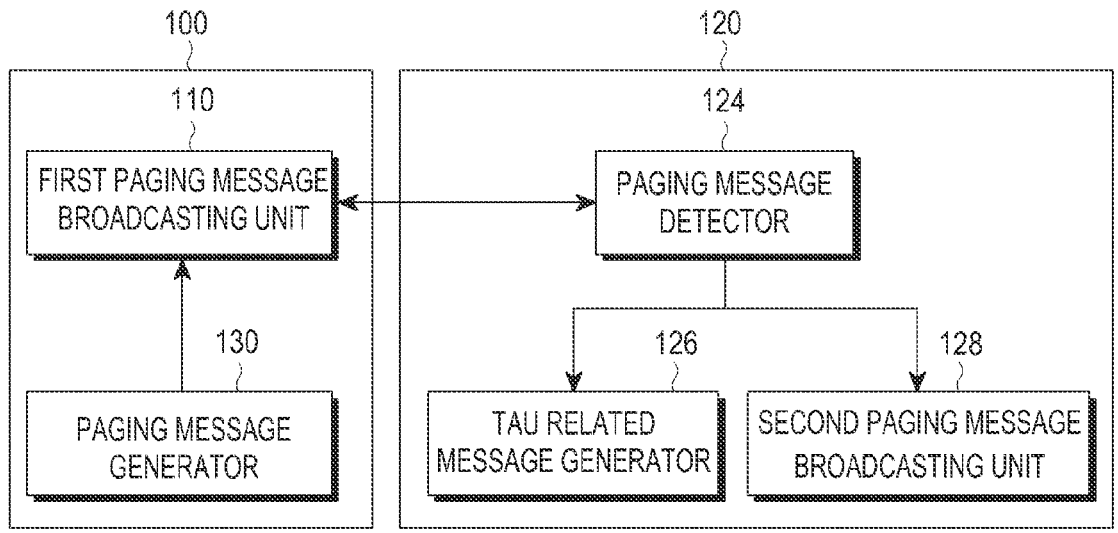
FIG. 1 is a block diagram of a network according to an exemplary embodiment of the present invention.

FIG. 1 is a block diagram of a network according to an exemplary embodiment of the present invention.

Referring to FIG. 1, the network according to an exemplary embodiment of the present invention includes an old Mobility Management Entity (MME) 100 and a new MME 120.

The old MME 100 refers to an MME which communicates with a target terminal before the target terminal leaves an area where the target terminal is most recently registered and moves to another area. The new MME 120 refers to an MME which communicates with a target terminal after the target terminal leaves an area where the target terminal is most recently registered and moves to another area.

The old MME 100 includes a first paging message broadcasting unit 110 and a paging message generator 130.

The paging message generator 130 generates a paging message to be broadcasted to the corresponding target terminal before the target terminal moves to a new Tracking Area Identity (TAI) list (from the old MME to the new MME). Further, when the first paging message broadcasting unit 110 receives an inquiry about whether the old MME 100 is performing the paging for the corresponding target terminal from the new MME 120, the first paging message broadcasting unit 110 identifies and responds to the inquiry.

The first paging message broadcasting unit 110 broadcasts the paging message to the corresponding target terminal before the target terminal moves to the new TAI list (from the old MME to the new MME).

The new MME 120 includes a receiver (not shown), a paging message detector 124, a TAU related message generator 126, and a second paging message broadcasting unit 128.

When the target terminal which will receive a voice call moves to a cell which is not included in the new Tracking Area Identity (TAI) list, and the target terminal accesses a packet network, the receiver of the new MME receives a Tracking Area Update (TAU) REQUEST message from the target terminal.

The paging message detector 124 decodes the TAU REQUEST message of the target terminal transmitted to the new MME managing the new TAI list and sends an inquiry to the first paging message broadcasting unit 110 of the old MME 100 about whether the paging for the corresponding target terminal is being performed in the old MME 100. Thereafter, when the paging message detector 124 receives an answer to the inquiry from the paging message broadcasting unit 110 of the old MME 100, the paging message detector 124 transmits a command to the TAU related message generator 126.

The TAU related message generator 126 generates a TAU ACCEPT message or a TAU REJECT message to be transmitted to the corresponding target terminal according to the command received from the paging message detector 124.

In a first exemplary embodiment of the present invention, when the TAU related message generator 126 receives an answer indicating that the paging for the corresponding target terminal is being performed in the old MME 100, the TAU related message generator 126 generates the TAU ACCEPT message including a CS paging indicator and transmits the generated TAU ACCEPT message to the corresponding target terminal.

In a second exemplary embodiment of the present invention, when the TAU related message generator 126 receives the answer indicating that the paging for the corresponding target terminal is being performed in the old MME 100, the TAU related message generator 126 generates the TAU ACCEPT message and makes a request for broadcasting an additional paging message to the second paging message broadcasting unit 128. The additional paging message informs of retransmission for existence or non-existence of the CSFB after the TAU ACCEPT message transmission.

The second paging message generator 128 generates a paging message according to the command transmitted from the TAU related message generator 126, and broadcasts the generated paging message to a newly registered TAI list area.

Figure 2:
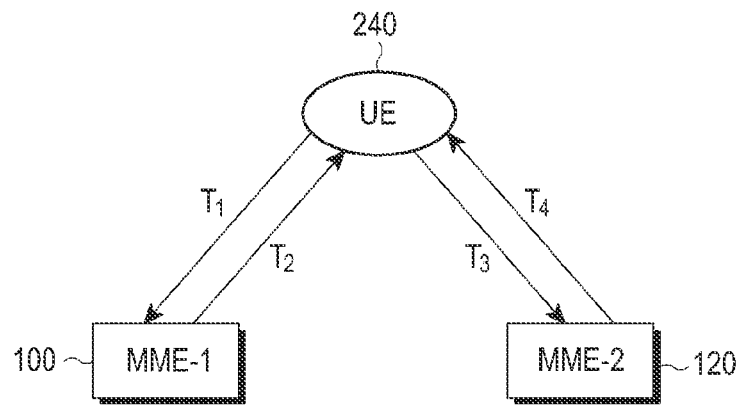
FIG. 2 is a signal flow diagram between a network and a terminal according to an exemplary embodiment of the present invention.
Figure 2:
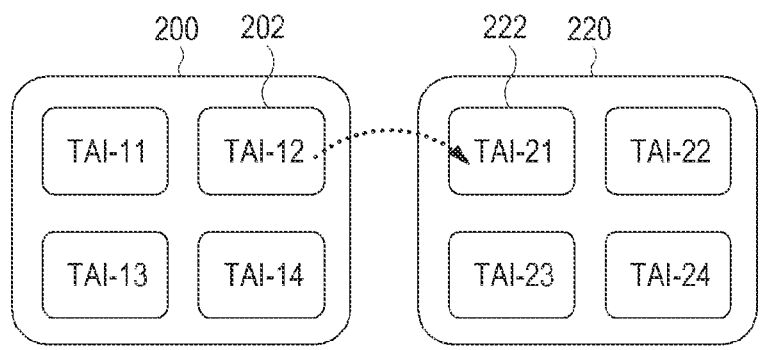

FIG. 2 is a signal flow diagram between a network and a terminal according to an exemplary embodiment of the present invention.

Referring to FIG. 2, the terminal refers to a target terminal 240 (operating in an idle mode) receiving a terminated call service.

MME-1 refers to the old MME 100 and is a network node which manages a TAI list 200 including TAI-11 to TAI-14. MME-2 refers to the new MME 120 and is a network node which manages a TAI list 220 including TAI-21 to TAI-24.

According to an exemplary embodiment of the present invention, when the terminal moves from an area where the terminal is most recently registered to an area where the terminal is not registered, MME-2 is a network of the area where the terminal is not registered. Hereinafter, the old MME is used interchangeably with MME-1, and the new MME 120 is used interchangeably with MME-2.

In T1, the target terminal 240 transmits an ATTACH-REQUEST message to the old MME 100 for a network access to an area managed by the old MME 100.

In T2, MME-1 transmits a TAU ACCEPT message to the target terminal 240 in response to the TAU REQUEST message transmitted in T1. During such a process, the TAI list 200 including TAI-11 to TAI-14 is inserted into the TAU ACCEPT message. The target terminal 240 updates a most recently registered TAI into TAI-12 202 and updates a Location Area Identity (LAI).

After T2, the target terminal 240 enters an idle mode and then moves from a TAI-12 area 202 to a TAI-21 area 222.

When a CS-domain terminated call for the target terminal 240 is generated in T2 or T3, the old MME 100 broadcasts a paging message including an ID of the corresponding target terminal 240 to TAI-11 to TAI-14 areas.

In T3, the target terminal 240 transmits the TAU REQUEST message to the new MME 120. At this time, the most recently registered TAI (last visited registered TAI) updated in T2 is inserted into the TAU REQUEST message and the LAI updated in T2 is included in an old location area identification.

In T4, MME-2 120 generates and transmits a TAU ACCEPT message including a CS paging indicator according to the first exemplary embodiment of the present invention in response to the TAU REQUEST message transmitted by the target terminal 240 in T3.

Further, in T4, MME-2 130 generates a TAU ACCEPT message according to the second exemplary embodiment of the present invention in response to the TAU REQUEST message transmitted by the target terminal 240 in T3. MME-2 130 transmits the generated TAU ACCEPT message to the target terminal, generates a paging message for retransmission of existence or non-existence of the CSFB, and then broadcasts the generated paging message to areas (TAI-21 to TAI-24) corresponding to the new TAI list of the target terminal 240.

In other words, in T4, MME-2 120 receives the TAU REQUEST message from the target terminal 240 having moved to the new MME (MME-2) 120, and decodes the received TAU REQUEST message by the paging message detector 124.

The paging message detector 124 extracts a most recently registered TAI parameter from the decoded TAU REQUEST message.

When the extracted and most recently registered TAI is included in TAI-21 to TAI-24 managed by MME-2, MME-2 makes a request for generating the TAU ACCEPT message to the TAU related message generator 126 in response to the TAU request of the target terminal 240.

When the extracted and most recently registered TAI is not included in TAI-21 to TAI-24 managed by MME-2, MME-2 sends an inquiry to the first paging message broadcasting unit 110 of the old MME 100 about whether an effective terminated call paging for the target terminal having transmitted the TAU REQUEST message is being performed. At this time, communication between the first paging message broadcasting unit 110 of the old MME 100 and the paging message detector 124 of the new MME 120 is general communication used between MMEs.

When an answer indicating that the effective terminated call paging for the corresponding target terminal is being performed is received from the paging message detector 124 of the old MME 100, the paging message detector 124 of MME-2 120 instructs the TAU related message generator 126 to generate the TAU ACCEPT message including the CS paging indicator (=TRUE) according to the first exemplary embodiment of the present invention. According to the command, the TAU related message generator 126 transmits the TAU ACCEPT message including the CS paging indicator (=TRUE) to the target terminal 240.

Further, the paging message detector 124 of MME-2 120 instructs the TAU related message generator 126 to transmit the TAU ACCEPT message to the target terminal 240 according to the second exemplary embodiment of the present invention. Further, the paging message detector 124 instructs the second paging message broadcasting unit 128 to broadcast the paging message including the ID of the target terminal 240 to the new TAI list areas. Thereafter, the second paging message broadcasting unit 128 broadcasts the paging message including the ID of the corresponding target terminal to the TAI-21 to TAI-24 areas.

Figure 3:
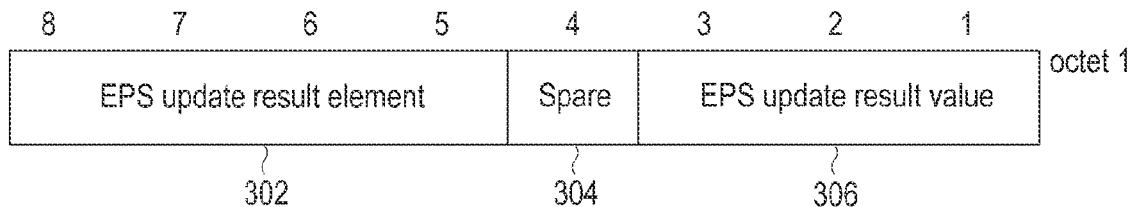
FIG. 3 illustrates a format of an information element indicating an Evolved Packet System (EPS) update result according to an exemplary embodiment of the present invention.

FIG. 3 illustrates a format of an information element indicating an Evolved Packet System (EPS) update result field according to an exemplary embodiment of the present invention.

Referring to FIG. 3, the information element showing the EPS update result field includes an EPS update result element field 302, a spare field 304, and an EPS update result value 306 as illustrated in FIG. 3.

The EPS update result value 306 can be expressed by one to three bits as shown in Table 1 below.

For example, "000" bit indicates an updated TA, "001" bit indicates a combination of the updated TA and an updated LA, "100" bit indicates the update TA and an activated ISR, and "101" bit indicates a combination of the updated TA and LA and the activated ISR.

A CS paging indicator value is set to a reserved value, that is, the spare field 304.

For example, when there is no current paging, the CS paging indicator value is set to the spare field 304 as "0". When there is a current paging, the CS paging indicator value is set to the spare field 304 as "1". The present invention has an effect in that there is no increase in additional signaling resources since the spare field 304 of the conventional IEs is used.

TABLE 1

| EPS update result value (octet 1, bit 1 to 3) | | | |
|---|---|---|---|
| Bits | | | |
| 3 | 2 | 1 | |
| 0 | 0 | 0 | TA updated |
| 0 | 0 | 1 | combined TA/LA updated |
| 1 | 0 | 0 | TA updated and ISR activate (NOTE) |
| 1 | 0 | 1 | combined TA/LA updated and ISR activated (NOTE) |
| All other values are reserved. | | | |
| Bit 4 of octet 1 → Paging indicator | | | |
| 0: No pending paging, 1: paging | | | |

NOTE:
Values "TA updated and ISR activated" and "combined TA/LA updated and ISR activated" are used only for a UE supporting also A/Gb or Iu mode.

According to the first exemplary embodiment of the present invention, a CS-paging-indicator field is included in the TAU-ACCEPT message. At a later time, paging message transmission for informing the corresponding target terminal of whether a terminated call is generated is not performed.

Figure 4:
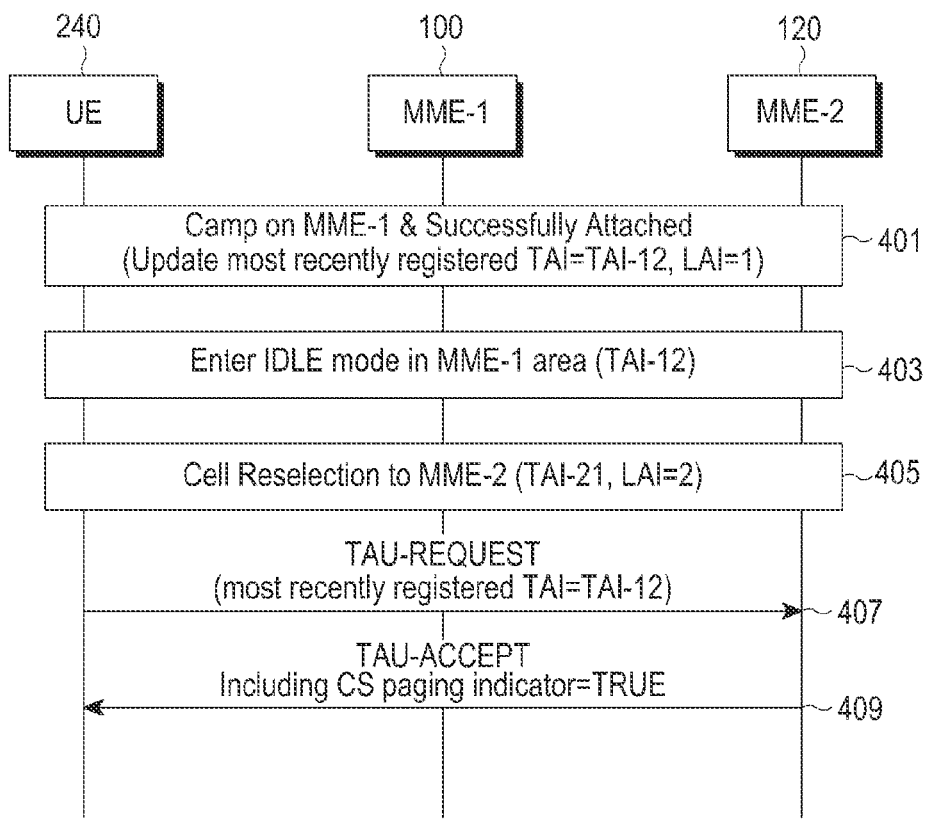
FIG. 4 is a signal flow diagram illustrating a terminated call paging method in a mobile communication system according to a first exemplary embodiment of the present invention.

FIG. 4 is a signal flow diagram illustrating a terminated call paging method in a mobile communication system according to the first exemplary embodiment of the present invention.

Referring to FIG. 4, the target terminal 240 camps on MME-1 100 and successfully completes an ATTACH process in step 401. At this time, the target terminal 240 updates the most recently registered TAI into TAI-12 202 and updates the LAI.

The target terminal 240 enters an idle mode in step 403 and then moves from the TAI-12 area 202 to the TAI-21 area 222 in step 405. That is, a cell re-selection process from MME-1 100 to MME-2 120 is performed. When the CS-domain terminated call for the target terminal 240 is generated, MME-2 120 receives the TAU REQUEST message from the target terminal 240 in step 407. The TAU REQUEST message includes a most recently registered TAI. For example, the most recently registered TAI is TAI-12.

MME-2 120 having received the TAU REQUEST message sends an inquiry to MME-1 100 about whether the effective terminated call paging for the target terminal is being performed. When an answer indicating that the effective terminated call paging for the corresponding target terminal is received from MME-1 100, MME-2 120 generates the TAU ACCEPT message including the CS paging indicator (=TRUE) according to the first exemplary embodiment of the present invention and transmits the generated TAU ACCEPT message to the target terminal in step 409. At a later time, paging message transmission for informing the corresponding target terminal of whether the terminated call is generated is not performed.

Figure 5:
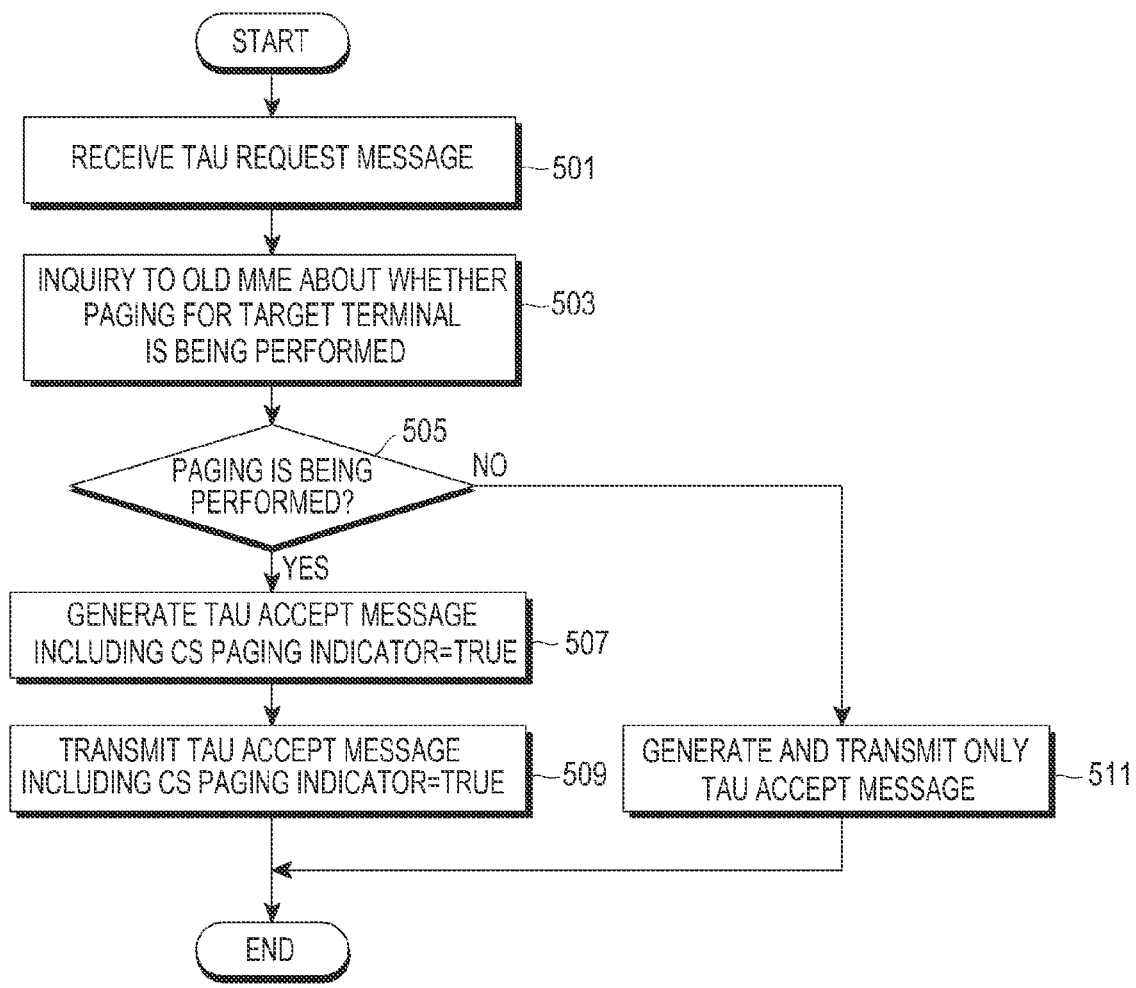
FIG. 5 is a flowchart illustrating a terminated call paging method in a new Mobility Management Entity (MME) according to the first exemplary embodiment of the present invention.

FIG. 5 is a flowchart illustrating a terminated call paging method in a new MME according to the first exemplary embodiment of the present invention.

Referring to FIG. 5, when a CS-domain terminated call for the target terminal 240 is generated, MME-2 120 receives a TAU REQUEST message from the target terminal 240 in step 501. The TAU REQUEST message includes a most recently registered TAI. MME-2 120 having received the TAU REQUEST message sends an inquiry to MME-1 100 about whether an effective terminated call paging for the target terminal is being performed in step 503. MME-2 120 determines whether an answer corresponds to performance of the effective terminated call paging for the target terminal in step 505. When the effective terminated call paging is being performed, MME-2 120 generates a TAU ACCEPT message including a CS paging indicator=TRUE according to the first exemplary embodiment of the present invention in step 507. Further, MME-2 120 transmits the generated TAU ACCEPT message including the CS paging indicator=TRUE to the target terminal 240 in step 509. At a later time, paging message transmission for informing the corresponding target terminal of whether the terminated call is generated is not performed.

When the effective terminated call paging is not being performed in step 505, MME-2 120 generates a TAU ACCEPT message including a CS paging indicator =TRUE in response to the TAU REQUEST message and then transmits the generated TAU ACCEPT message to the target terminal in step 511.

Figure 6:
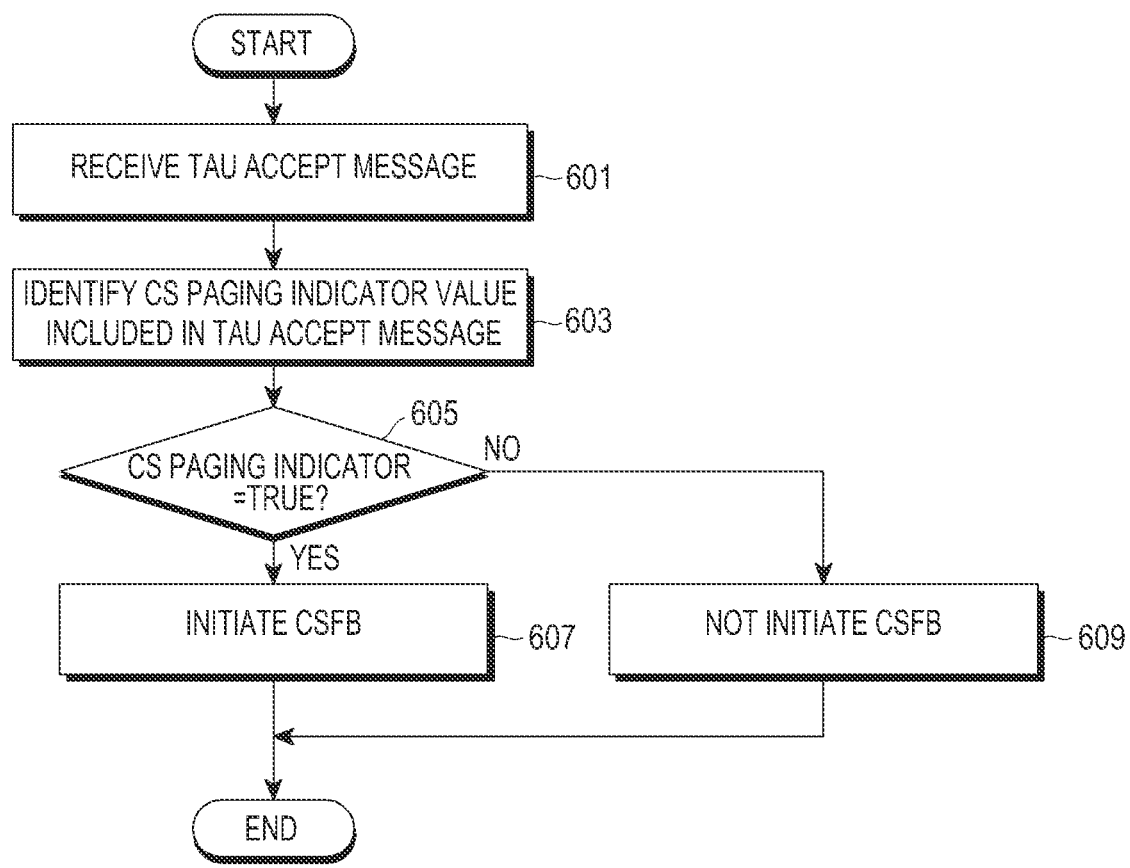
FIG. 6 is a flowchart illustrating a terminated call paging method in a terminal according to the first exemplary embodiment of the present invention.

FIG. 6 is a flowchart illustrating a terminated call paging method in a terminal according to the first exemplary embodiment of the present invention.

Referring to FIG. 6, the target terminal receives the TAU ACCEPT message from MME-2 120 in step 601. After decoding the received TAU ACCEPT message, the target terminal identifies a set value of the CS paging indicator included in the TAU ACCEPT message in step 603. When the CS paging indicator corresponds to TRUE, the target terminal initiates a Circuit Switched Fallback (CSFB) process in step 607. A detailed description of the CSFB initiation process will be omitted in the specification.

However, when the set value of the CS paging indicator corresponds to FALSE in step 605, the target terminal does not initiate the CSFB process in step 609. That is, when the CS paging indicator corresponds to FALSE, the target terminal recognizes that there is no terminated call for the target terminal itself.

According to the second exemplary embodiment of the present invention, a new field is not added to the TAU-ACCEPT message. However, whether the terminated call for the corresponding target terminal is generated is informed using another paging message. That is, according to the second exemplary embodiment of the present invention, when the terminated call is generated, MME-2 performs an operation including TAU-ACCEPT transmission and paging message transmission (including the ID of the corresponding target terminal). However, when the terminated call is not generated, MME-2 transmits only the TAU-ACCEPT message.

However, when MME-2 receives the TAU-REQUEST message from the target terminal, both the first and second exemplary embodiments of the present invention include the operation of inquiring MME-1 about "whether the paging for the corresponding target terminal is being performed".

Figure 7:
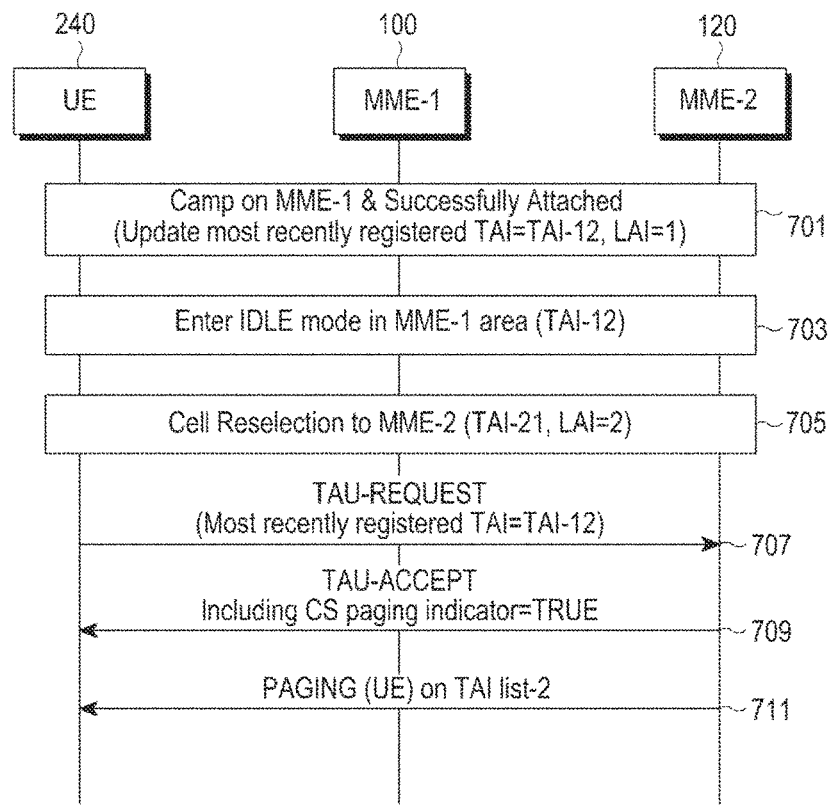
FIG. 7 is a signal flow diagram illustrating a terminated call paging method in a mobile communication system according to a second exemplary embodiment of the present invention.

FIG. 7 is a signal flow diagram illustrating a terminated call paging method in a mobile communication system according to the second exemplary embodiment of the present invention.

Referring to FIG. 7, the target terminal 240 camps on MME-1 100 and successfully completes an ATTACH process in step 701. The target terminal 240 updates a most recently registered TAI into TAI-12 202 and updates a Location Area Identity (LAI).

The target terminal 240 enters an idle mode in step 703, and then moves from the TAI-12 area 202 to the TAI-21 area 222 in step 705. That is, a cell re-selection process from MME-1 100 to MME-2 120 is performed. At this time, a CS-domain terminated call for the target terminal 240 is generated and MME-2 120 receives a TAU REQUEST message from the target terminal 240 in step 707. The TAU REQUEST message includes a most recently registered TAI. For example, the most recently registered TAI is TAI-12.

MME-2 120 having received the TAU REQUEST message sends an inquiry to MME-1 100 about whether an effective terminated call paging for the target terminal is being performed. When an answer indicating that the effective terminated call paging for the corresponding target terminal is received from MME-1 100, MME-2 120 generates the TAU ACCEPT message including the CS paging indicator (=TRUE) according to the first exemplary embodiment of the present invention and transmits the generated TAU ACCEPT message to the target terminal in step 709. Thereafter, MME-2 120 generates a paging message and broadcasts the generated paging message to areas included in a new TAI list in step 711. That is, according to the second exemplary embodiment of the present invention, after transmitting the TAU ACCEPT message to the target terminal, MME-2 230 broadcasts retransmission for existence or non-existence of the CSFB through the paging message.

Figure 8:
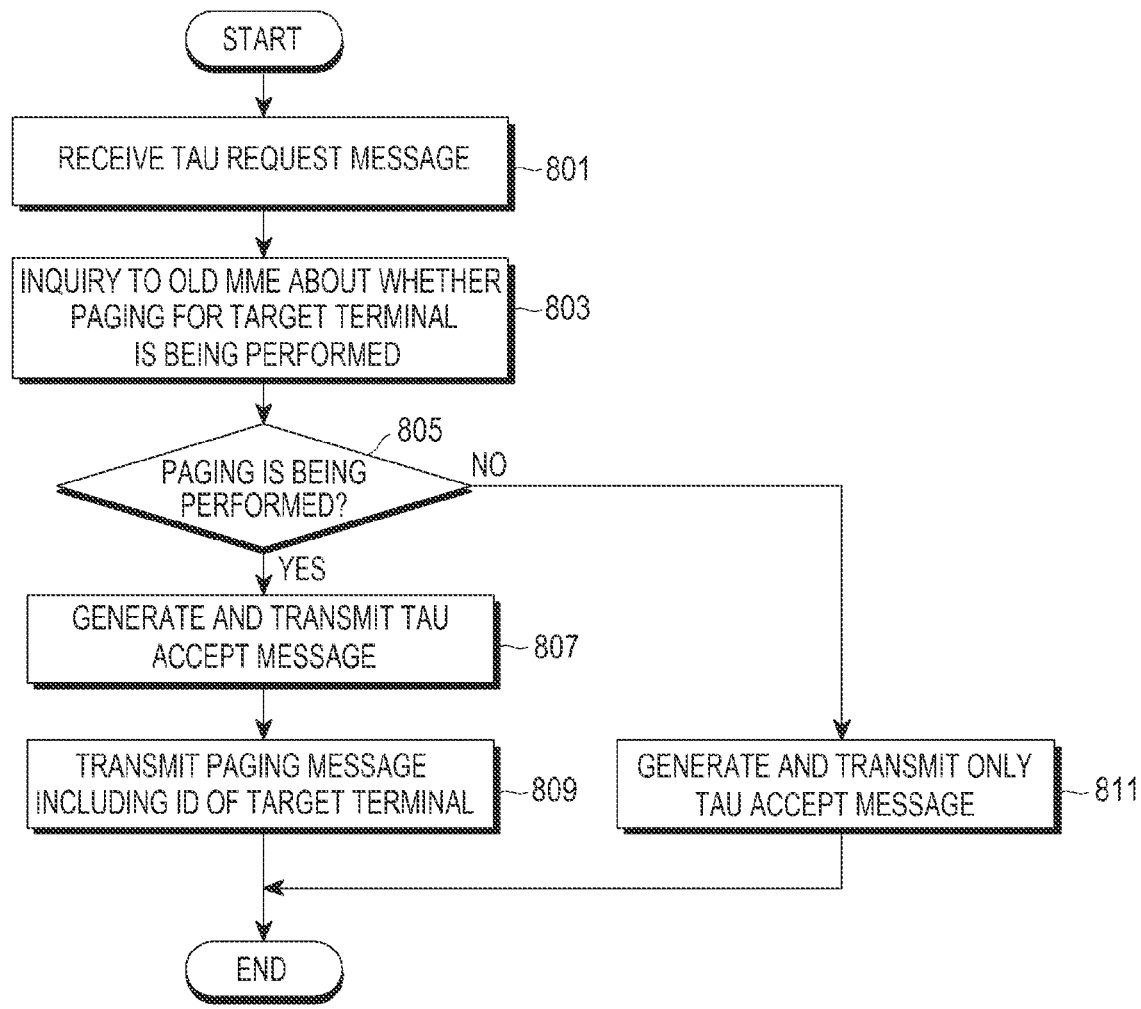
FIG. 8 is a flowchart illustrating a terminated call paging method in a new MME according to the second exemplary embodiment of the present invention.

FIG. 8 is a flowchart illustrating a terminated call paging method in a new MME according to the second exemplary embodiment of the present invention.

Referring to FIG. 8, the CS-domain terminated call for the target terminal 240 is generated just before step 801, and MME-2 120 receives the TAU REQUEST message from the target terminal 240 in step 801. The TAU REQUEST message includes a most recently registered TAI. MME-2 120 having received the TAU REQUEST message sends an inquiry to MME-1 100 about whether the effective terminated call paging for the target terminal is being performed in step 803. MME-2 120 determines whether an answer corresponds to performance of the effective terminated call paging for the target terminal in step 805. When the effective terminated call paging is being performed, MME-2 120 generates the TAU ACCEPT message according to the second exemplary embodiment of the present invention and transmits the generated TAU ACCEPT message to the target terminal 240 in step 807. Thereafter, MME-2 120 generates the paging message including the ID of the target terminal and broadcasts the paging message to areas included in the new TAI list in step 809. That is, according to the second exemplary embodiment of the present invention, after transmitting the TAU ACCEPT to the target terminal, MME-2 120 broadcasts retransmission for existence or non-existence of the CSFB through the paging message including the ID of the target terminal.

When the effective terminated call paging is not being performed in step 805, MME-2 120 generates and transmits only the TAU ACCEPT message in response to the TAU REQUEST message in step 811. That is, when the effective terminated call paging is not being performed, MME-2 120 recognizes that there is no terminated call for the corresponding target terminal, and generates and transmits only the TAU-ACCEPT message.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for paging a terminated voice call in a new mobility management entity (MME) of a mobile communication system, the method comprising:
   receiving a tracking area update (TAU) request message including more than one last visited registered tracking area identity (TAI) in a first tracking area identity (TAI) list from a target terminal if the target terminal hands over from a first TAI of a plurality of first TAIs included in the first TAI list managed by an old MME to a second TAI of a plurality of second TAIs included in a second TAI list managed by the new MME and the target terminal accesses a packet network;
   determining whether the last visited registered TAI included in the TAU request message is included in the second TAI list;
   transmitting an inquiry about whether a terminated voice call for the target terminal is present to the old MME if the last visited registered TAI is not included in the second TAI list;
   generating a TAU accept message including a circuit switched (CS) indicator if the terminated voice call for the target terminal is present; and
   transmitting the TAU accept message including the CS indicator to the target terminal to indicate to the target terminal that the terminated voice call for the target terminal is present,
   wherein the CS indicator indicates whether a circuit switched fallback indicator (CSFB) procedure is to be performed.

2. The method of claim 1, wherein the CS indicator is set to a reserved bit within an information element field having an evolved packet system (EPS) update result.

3. The method of claim 1, further comprising:
   generating the TAU accept message including the CSFB indicator if the last visited registered TAI is included in the second TAI list.

4. An apparatus for paging a terminated voice call in a new mobility management entity (MME) of a mobile communication system, the apparatus comprising:
   a receiver configured to receive a tracking area update (TAU) request message including more than one last visited registered tracking area identity (TAI) in a first tracking area identity (TAI) list from a target terminal if the target terminal hands over from a first TAI of a plurality of first TAIs included in the first TAI list managed by an old MME to a second TAI of a plurality of second TAIs included in a second TAI list managed by the new MME and the target terminal accesses a packet network;
   a paging message detector configured to:
      determine whether the last visited registered TAI included in the TAU request message is included in the second TAI list, and
      transmit an inquiry about whether a terminated voice call paging for the target terminal is present to the old MME if the last visited registered TAI is not included in the second TAI list;
   a TAU related message generator configured to generate a TAU accept message including a circuit switched (CS) indicator if the terminated voice call for the target terminal is present; and
   a paging message transmitter configured to transmit the TAU accept message including the CS indicator to the target terminal to indicate to the target terminal that the terminated voice call for the target terminal is present, wherein the CS indicator indicates whether a circuit switched fallback (CSFB) procedure is to be performed.

5. The apparatus of claim 4, wherein the CS indicator is set to a reserved bit within an information element field having an evolved packet system (EPS) update result.

6. The apparatus of claim 4, wherein the paging message detector is configured to instruct the TAU related message generator to generate the TAU accept message including the CS indicator if the last visited registered TAI is included in the second TAI list.

7. A method of paging a terminated voice call in a terminal of a mobile communication system, the method comprising:
   transmitting a tracking area update (TAU) request message including more than one last visited registered tracking area identity (TAI) in a first tracking area identity (TAI) list to a new Mobility Management Entity (MME) if the target terminal hands over from a first TAI of a plurality of first TAIs included in the first TAI list managed by an old MME to a second TAI of a plurality of second TATs included in a second TAI list managed by the new MME and the target terminal accesses a packet network;
   receiving a TAU accept message including a circuit switched (CS) indicator from a new MME if the terminated voice call for the target terminal is present; and
   transmitting the TAU accept message to the target terminal.

8. The method of claim 7, wherein the CS indicator is set to a reserved bit within an information element field having an evolved packet system (EPS) update result.

9. A method for paging a terminated voice call in a new Mobility Management Entity (MME) of a mobile communication system, the method comprising:
   receiving a tracking area update (TAU) request message including more than one last visited registered tracking area identity (TAI) in a first tracking area identity (TAI) list from a target terminal if the target terminal hands over from a first TAI of a plurality of first TAIs included in the first TAI list managed by an old MME to a second TAI of a plurality of second TAIs included in a second TAI list managed by the new MME and the target terminal accesses a packet network;
   determining whether the last visited registered TAI included in the TAU request message is included in the second TAI list;
   transmitting an inquiry about whether a terminated voice call paging for the target terminal is present to an old MME if the last visited registered TAI is not included in the second TAI list;
   generating a TAU accept message if the terminated voice call for the target terminal is present and transmitting the generated TAU accept message to the target terminal; and
   broadcasting a paging message to the second cell,
   wherein the paging message indicates whether a circuit switched fallback (CSFB) procedure is to be performed.

10. The method of claim 9, wherein the paging message includes an identification (ID) of the target terminal.

11. An apparatus for paging a terminated voice call in a new Mobility Management Entity (MME) of a mobile communication system, the apparatus comprising:
   a receiver configured to receive a tracking area update (TAU) request message including more than one last visited registered tracking area identity (TAI) in a first tracking area identity (TAI) list from a target terminal if the target terminal hands over from a first TAI of a plurality of first TAIs included in the TAI list managed by an old MME to a second TAI of a plurality of second TAIs included in a second TAI list managed by the new MME;
   a paging message detector configured to:
      determine whether the last visited registered TAI included in the TAU request message is included in the second TAI list, and
      transmit an inquiry about whether a terminated voice call paging for the target terminal is present to an old MME if the last visited registered TAI is not included in the second TAI list;
   a TAU related message generator configured to generate a TAU accept message if the terminated voice call paging for the target terminal is present and transmit the generated TAU accept message to the target terminal; and
   a paging message transmitter configured to broadcast a paging message to the second cell,
   wherein the paging message indicates whether a circuit switched fallback (CSFB) procedure is to be performed.

12. The method of claim 11, wherein the paging message includes an identification (ID) of the target terminal.

13. A non-transitory computer-readable storage medium storing thereon instructions for executing a method for paging a terminated voice call in a new mobility management entity (MME) of a mobile communication system, the instructions comprising:
   a first set of instructions for receiving a tracking area update (TAU) request message including more than one last visited registered tracking area identity (TAI) in a first tracking area identity (TAI) list from a target terminal if the target terminal hands over from a first TAI of a plurality of first TAIs included in the TAI list managed by an old MME to a second TAI of a plurality of second TATs included in a second TAI list managed by the new MME and the target terminal accesses a packet network;
   a second set of instructions for determining whether the last visited registered TAI included in the TAU request message is included in the second TAI list;
   a third set of instructions for transmitting an inquiry about whether a terminated voice call for the target terminal is present to the old MME if the last visited registered TAI is not included in the second TAI list;
   a fourth set of instructions for generating a TAU accept message including a circuit switched (CS) indicator if the terminated voice call for the target terminal is present; and
   a fifth set of instructions for transmitting the TAU accept message including the CSFB indicator to the target terminal to indicate to the target terminal that the terminated voice call for the target terminal is present,
   wherein the CS indicator indicates whether a circuit switched fallback (CSFB) procedure is to be performed.

14. A non-transitory computer-readable storage medium storing thereon instructions for executing a method for paging a terminated voice call in a new mobility management entity (MME) of a mobile communication system:
   a first set of instructions for receiving a tracking area update (TAU) request message including more than one last visited registered tracking area identity (TAI) in a first tracking area identity (TAI) list from a target terminal if the target terminal handovers from a first TAI of a plurality of first TAIs included in the first TAI list is managed by an old MME to a second TAI of a plurality of second TATs included in a second TAI list is managed by the new MME and the target terminal accesses a packet network;

a second set of instructions for determining whether the last visited registered TAI included in the TAU request message is included in the second TAI list;

a third set of instructions for transmitting an inquiry about whether a terminated voice call paging for the target terminal is present to an old MME if the last visited registered TAI is not included in the second TAI list;

a fourth set of instructions for generating a TAU accept message if the terminated voice call paging for the target terminal is present and transmitting the generated TAU accept message to the target terminal; and a fifth set of instructions for broadcasting a paging message to the second cell, wherein the paging message indicates whether a circuit switched fallback (CSFB) procedure is to be performed.

* * * * *